No. 637,024. Patented Nov. 14, 1899.
L. PENWELL.
REPAIRING OR JOINING DEVICE.
(Application filed Apr. 29, 1898.)
(No Model.)

Witnesses:
W. S. Wood
Otis A. Earl

Inventor,
Landon Penwell
By Fred L. Chappell
Att'y.

UNITED STATES PATENT OFFICE.

LANDON PENWELL, OF NEW TROY, MICHIGAN, ASSIGNOR OF ONE-HALF TO GEORGE F. PHILLIPPY, OF GALIEN, MICHIGAN.

REPAIRING OR JOINING DEVICE.

SPECIFICATION forming part of Letters Patent No. 637,024, dated November 14, 1899.

Application filed April 29, 1898. Serial No. 679,276. (No model.)

*To all whom it may concern:*

Be it known that I, LANDON PENWELL, a citizen of the United States, residing at the village of New Troy, in the county of Berrien and State of Michigan, have invented certain new and useful Improvements in Repairing or Joining Devices, of which the following is a specification.

This invention relates to a means for repairing saw-plates or any plates or articles where it is desired to draw a crack or parts together, and is particularly well adapted for use on thin plates.

In practice it has heretofore been found that when a circular saw cracks it is necessary, in order to utilize the same further, to have it cut down within the crack, making a smaller saw of the same, or else, if the saw is already small, it must be discarded. Also in many cases plates in boilers or machinery crack and there is no convenient means of drawing the crack or seam together and positively retaining it there.

The objects of this invention are, first, to provide a simple and efficient means of repairing saw-plates or similar plates; second, to provide an improved means of repairing or joining comparatively thin plates which shall hold the same securely and at the same time not add to the thickness of the same in any way; third, to provide an improved and simple means of repairing or joining parts of thin plates in which a strong and simple fastening is desired. Further objects will definitely appear in the detailed description to follow. I accomplish these objects of my invention by the devices and means described in this specification.

The invention is definitely pointed out in the claims.

The structure and means are fully illustrated in the accompanying drawings, in which—

Figure 1:
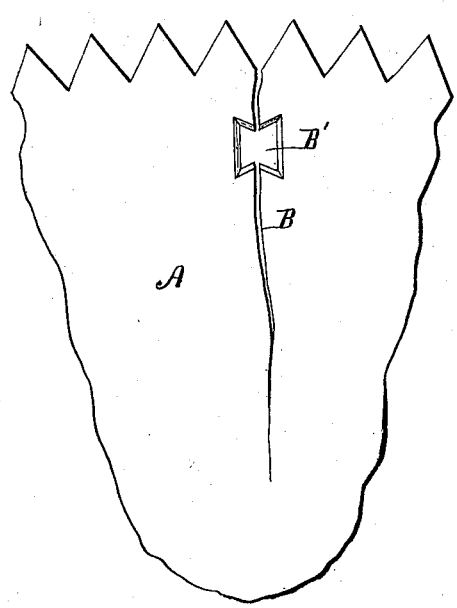
Figure 2:
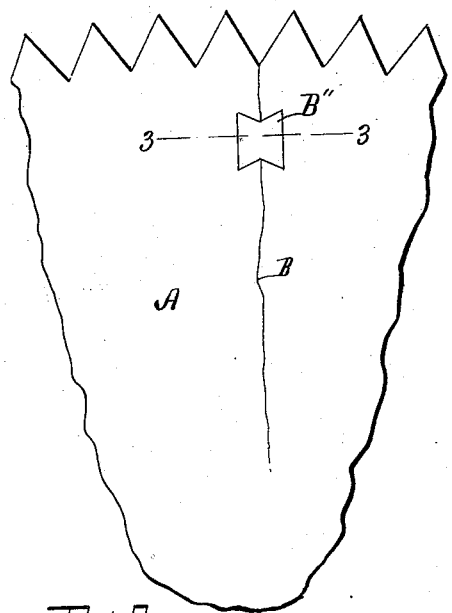
Figure 3:
Figure 4:
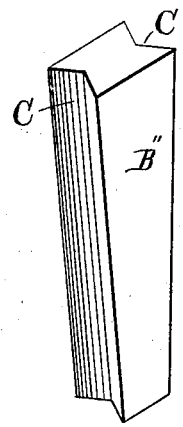
Figure 5:
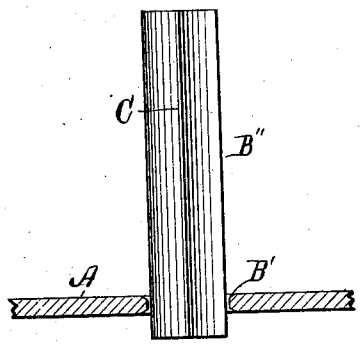

Figure 1 represents a portion of a saw-plate prepared to receive my improved mending key or device, the crack in the plate being shown open. Fig. 2 shows the same portion of a plate in which my improved mending device has been inserted and finished, showing that the parts of the plate are drawn together so as to completely close the crack or seam. Fig. 3 is a transverse detail sectional view taken on line 3 3 of Fig. 2. Fig. 4 is a perspective view of the key itself by which the drawing and mending are effected. Fig. 5 shows a detail side view of the key as it is inserted into a saw-plate A before the plate has been drawn together to close the seam.

In the drawings similar letters of reference refer to similar parts throughout the several views.

Referring to the lettered parts of the drawings, A represents a portion of a saw-blade. B indicates a crack in the same and is the part which my improved device is used to repair. In repairing the saw-plate a dovetail opening B' is made in the plate each side of the seam exactly opposite and symmetrical to each other. This dovetail opening is beveled around its edges on both sides of the plate to form a countersink. A key B" is provided which is of even thickness from top to bottom, with its edges grooved and tapered, so that each side corresponds to the dovetail in the plate. The key is made tapering, as stated, so that as it is inserted the parts engaging the dovetail openings grow gradually wider, and owing to the dovetail consequently draw the plates tight to each other, closing the seam, as indicated in Fig. 2. After the key has thus been driven into the plate it is cut off close to the plate on each side and is then welded or riveted down, so that the edges of the part remaining expand out into the countersink portions, and the key is positively retained in position, and consequently holds with its full strength the broken parts of the plate together and without adding to the thickness of the same and is not in the slightest danger of being displaced.

I have shown but one of my devices in use in the saw-plate; but it must be obvious to any mechanic that as many devices could be used on the same as desired and they might be made larger or smaller than the one I have illustrated here.

As softer or tougher steel can be employed for the wedge than is used for the saw, it will be observed that the parts of the plate will be held together stronger with my improved fastener properly inserted than they are in the first place.

In certain instances where plates are repaired it may be desired to have only one side finished flat with the plate, or the matter of the finish may be immaterial in such cases, and the entire key B″ may be left in place and serve its purpose.

The particular form of wedge-shaped key is adapted to join plates or articles of any description and is very useful in repairing or joining parts too numerous to mention.

Having thus described my invention, what I claim as new, and desire to secure by Letters Patent, is—

1. A joint for steel saws or similar plates formed by dovetailed slots in the plates facing each other; a double dovetailed key fitted into said slots to retain the plates together, the ends of which are riveted into suitable countersinks in the slots to retain the key in place.

2. A joint for steel saws or similar plates formed by dovetailed slots in the plates facing each other; a double dovetailed key with tapering faces fitted into said slots to retain the plates together, the ends of which are riveted into suitable countersinks in the slots to retain the key in place.

3. A wedge-key for joining plates together formed with opposite parallel plane faces and containing oppositely-faced dovetailed grooves formed in its tapering sides for insertion into the slots to draw the plates together, as specified.

In witness whereof I have hereunto set my hand and seal in the presence of two witnesses.

LANDON PENWELL. [L. S.]

Witnesses:
A. W. PIERCE,
ALMIRA PIERCE.